April 20, 1965

H. R. HUNT

3,179,194

FRAME AND WHEEL SUSPENSION ARRANGEMENT FOR
SELF-PROPELLED PLANT SPRAYER

Filed Dec. 31, 1962

INVENTOR.
HAROLD R. HUNT
BY
Fishburn and Gold
ATTORNEYS

United States Patent Office 3,179,194
Patented Apr. 20, 1965

3,179,194
FRAME AND WHEEL SUSPENSION ARRANGE-
MENT FOR SELF-PROPELLED PLANT SPRAYER
Harold R. Hunt, 1301 Arlington, Box 331,
Wellington, Tex.
Filed Dec. 31, 1962, Ser. No. 248,764
3 Claims. (Cl. 180—1)

This invention relates to self-propelled plant spraying apparatus, and more particularly to improvements in such apparatus which permit efficient crop spraying over rough ground at high speed.

In recent years, the spraying of crops has become relatively common for purposes such as controlling insects, preventing plant diseases, killing weeds and defoliating cotton. The cost of applying the spray solutions to crops is a prime factor in producing a profitable yield and, with respect to large cultivated areas, two methods of application are generally available. The first method is by the use of low flying aircraft which has the advantage of extremely high speed but the disadvantages of a large unavoidable waste of valuable chemicals and the inability to uniformly spray all parts of a field. The second method is by the use of ground rigs which generally perform a much more uniform job of spraying without large waste but are painfully slow in operation over rough cultivated fields while time is often of the essence.

The principal objects of the present invention are: to provide a high bed ground-supported crop spraying apparatus which is operable at speeds heretofore unattainable on rough cultivated fields; to provide a spray machine having horizontally extending spray booms which are conveniently remotely adjustable to optimum level heights for particular crops and which my be pivoted into various desired positions for clearance and storage purposes; to provide a highly maneuverable wheeled crop spraying machine which may be operated at high speed with safety and with ease and great accuracy of steering control; to provide such apparatus wherein depending tanks for storing spraying chemicals form an integral structural part of the machine frame and the tank contents are constantly maintained at equal levels and so located as to properly maintain apparatus balance during use; to provide such a machine having high lateral and vertical clearance between side wheels permitting same to be driven longitudinally over crop rows and yet permitting very large deflections between the machine bed and wheels and ease of steering for smooth and controlled riding over rough ground; to provide such an apparatus wherein weight is equally distributed on front and rear wheels whether the spray tanks are loaded or empty; and to provide such a machine which is surprisingly simple in construction, rugged, and easily maintained.

Other objects and advantages of this invention will become apparent from the following description taken in connection with the accompanying drawings wherein are set forth by way of illustration and example certain embodiments of this invention.

Referring to the drawings in more detail:

The reference numeral 1 generally indicates a crop spraying machine embodying this invention. The machine 1 includes an elongated horizontally extending frame bed broadly designated 2 having a front portion 3 and a rear portion 4. The frame bed 2 has a plurality of transversely extending rigid braces or pipes 5 forming the major transverse structural elements of the machine. A prime mover 6 in the form of a conventional internal combustion engine having a radiator 7 and shiftable gear transmission 8 is suitably supported on the frame bed 2. An operator's seat 12 is mounted on the frame bed in proper relation to the steering column 10 and suitable resilient mounting structure 13 partially isolates the operator from rough jarring during high speed machine operation.

Figure 1:
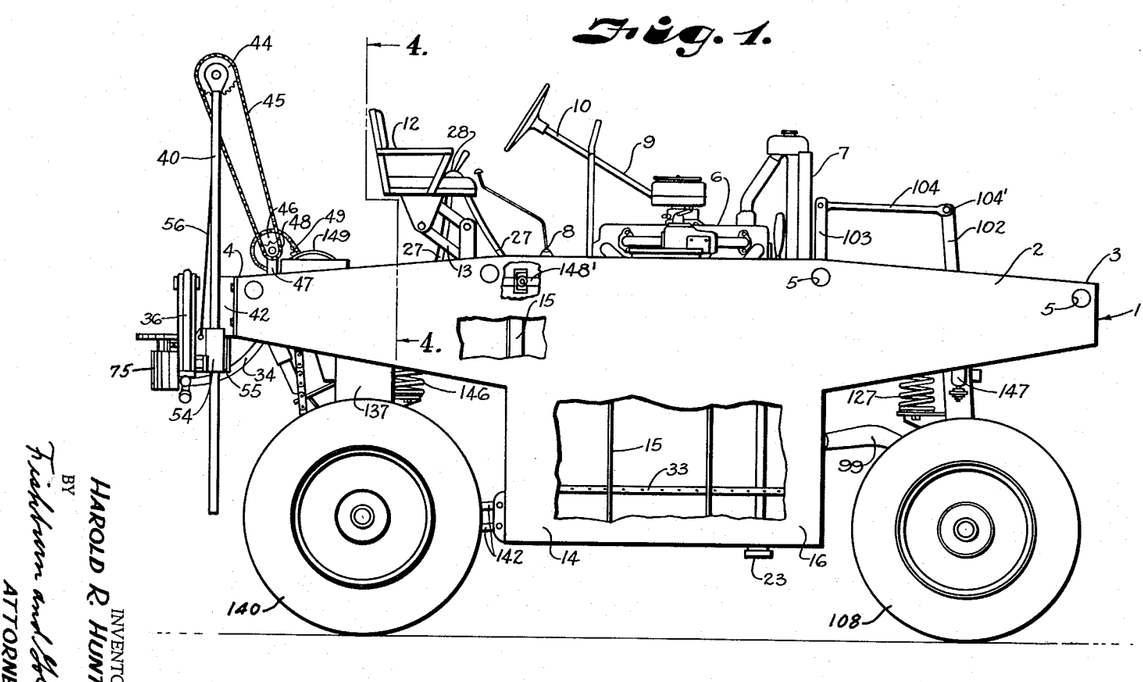
FIG. 1 is a side elevational view of a crop spraying machine embodying this invention with portions broken away to show interior construction.

A pair of laterally spaced elongated tanks 14 form an integral part of the frame bed 2 and depend therefrom approximately centrally between the front and rear portions 4 and 5, as best illustrated in FIG. 1. The tanks 14 have suitable bracing members 15 therein adding rigidity thereto whereby the walls 16 of the tanks 14 provide longitudinal structural strength for the frame bed 2.

A suitable rotary pump 17 is operably connected to the prime mover 6 and conduits 18 and 19 respectively connect to the input 20 of the pump through a suitable filter 21. The conduits 18 and 19 extend into the interior 22 of the tanks 14 and terminate at the lower ends thereof within depending reservoir portions 23 which permit the substantially complete drainage of chemicals from the tanks 14 by the conduits 18 and 19. The output 24 of the pump 17 communicates with a conduit 25 which is divided into a return portion 26 and an outlet portion 27 leading to spray booms described hereinafter. A valve 28 is connected into the outlet portion 27, the valve being preferably located adjacent the operator's seat 12 for convenient control by the operator. A pressure-operated valve 29 is located in the conduit return portion 26 and communicates with a dividing conduit 30 which terminates at opposite ends 31 and 32 thereof in the tanks 14. The ends 31 and 32 communicate with perforated tubes 33 extending longitudinally horizontally within the tanks 14 near the bottoms thereof.

Figures 4, 8, 9:
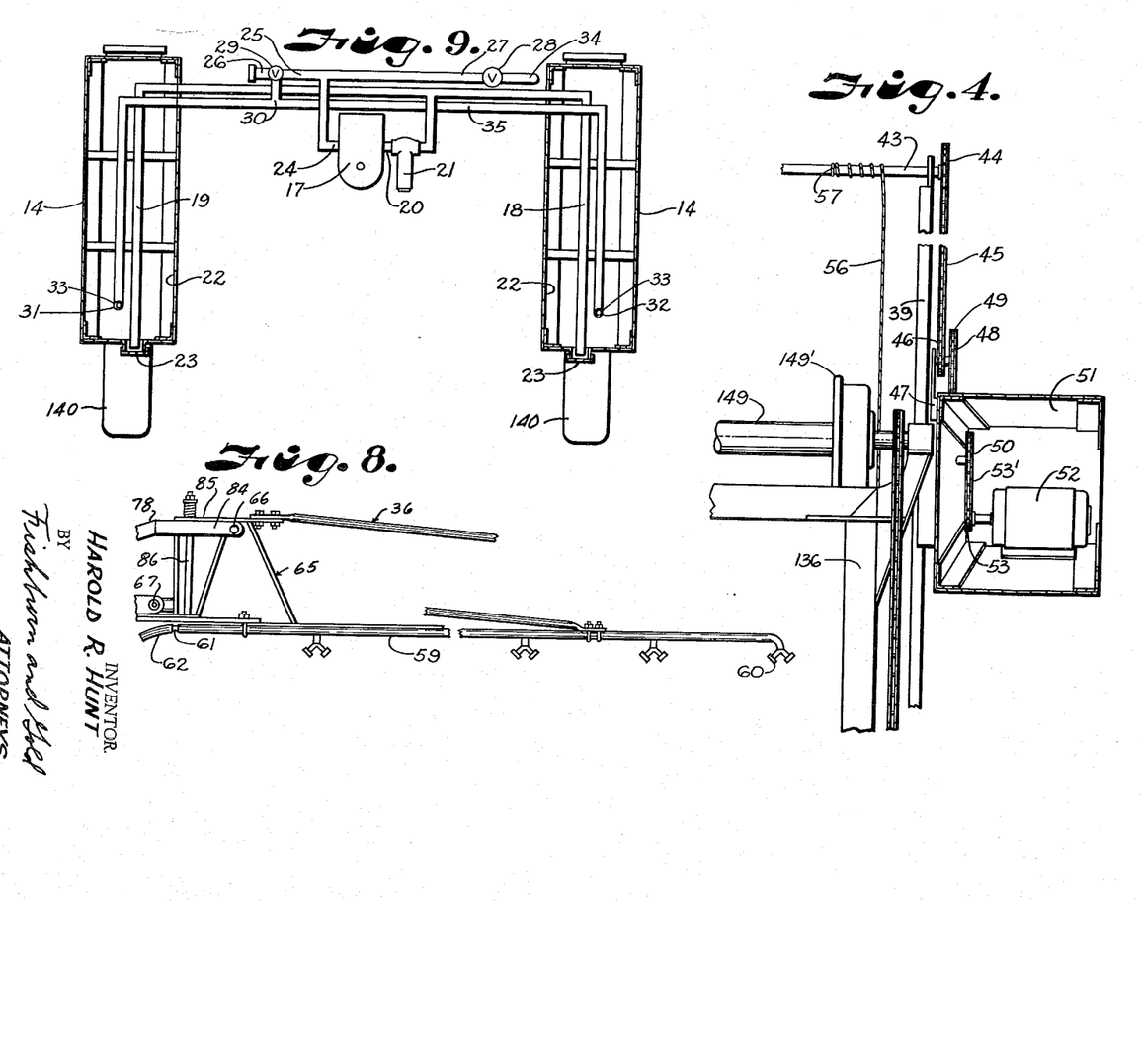
FIG. 4 is an enlarged fragmentary cross-sectional view through the crop spraying machine taken on the line 4—4, FIG. 1, particularly showing the spray boom raising winch members.
FIG. 8 is a fragmentary front elevational view of a spray boom in horizontal spraying position.
FIG. 9 is a partially schematic cross-sectional front elevation through the spraying machine showing the chemical spray circulation and storage system.

The output volume of the pump 17 is always greater than the flow past the valve 28, even when fully opened. The flow through the valve 28 is directed by means of conduits 34 to the spray booms (described hereinafter), however, the excess output from the pump 17 causes sufficient pressure in the outlet portion 27 to partially open the pressure-operated valve 29 whereupon the excess fluid is sprayed out under pressure from the perforated tubes 33. The flow from the tubes 33 keeps the solutions in the tanks 14 in a continually agitated condition while crops are being sprayed. Since the dividing conduit 30 is unobstructed between the tanks 14, the level of the liquid chemicals therein is constantly maintained at the same elevation by a siphoning action to prevent excess weight on one side of the machine. This is accomplished even though the crossing portion 35 of the conduit 30 is well above the normal level of chemicals in the tanks 14 so that high clearance may be provided between the tanks, FIG. 9.

A pair of elongated normally horizontally laterally outwardly extending spray booms 36 and 37 are connected by structure broadly designated 38 to the frame bed 2 at the rear portion 4 thereof. The structure 38 includes a pair of spaced apart upwardly extending parallel tubular elongated standards 39 and 40. Brackets 41 and 42 are secured to the respective standards 39 and 40 intermediate the ends thereof and the brackets 41 and 42 are in turn suitably secured to the frame bed at the rear portion 4 thereof. A lift shaft 43 is rotatably mounted on and extends between the upper ends of the standards 38 and 39 and terminates at one end thereof in a sprocket wheel 44. A sprocket chain 45 is engaged with the sprocket wheel 44 and also engages an idler sprocket 46 mounted by means of a bracket 47 to the frame bed 2. The idler sprocket 46 rotates with a sprocket 48 operably engaged through a chain 49 to a sprocket 50 rotatably mounted on the frame bed 2 and within a boxed end 51 of the frame bed adjacent the rear portion 4. A suitable motor 52 drives a sprocket 53 which engages a chain 53' also engaging the sprocket 50 whereby the actuation of the motor 52 results in a rotation of the lift shaft 43. The motor 52 is of the type which is selectively reversible and self-braking whereby the lift shaft 43 may be remotely rotated from suitable controls near the seat 12 and subsequently maintained in any desired rotational position.

A pair of vertically extending sleeves 54 are slidably engaged with the respective standards 39 and 40 and have suitable vertically extending slots 55 therein permitting the sleeves 54 to vertically slide on the standards past the respective brackets 41 and 42. A pair of cables 56 each has one end 57 thereof fixed at spaced-apart positions to the lift shaft 43 and the other end 58 thereof anchored respectively to the sleeves 54 whereby the rotation of the lift shaft 43 simultaneously raises the two sleeves. The spray booms 36 and 37, by means of structure described hereinafter, are secured to the sleeves 54 whereby the spray booms may be selectively raised and lowered as a unit while extending laterally horizontally outwardly from the frame bed 2 at right angles.

The spray booms 36 and 37 includes pipes 59 having suitable pressure-actuated spray nozzles 60 spaced therealong and communicating at the inner ends 61 thereof with flexible hoses 62 which in turn communicate with opposite ends of an intermediate pipe 63 fixed to the boom mounting structure 38. The pipe 63 connects to the pump output conduits 34 and suitable valves 63' permit selective flow to only one or the other of the pipes 59 if desired. The pipe 63 has additional spray nozzles 64 spaced therealong to provide a continuity of nozzle spacing between the respective pipes 59. The pipes 59 are supported by bracing structure broadly designated 65 having upper and lower spaced apart mounting ends 66 and 67 respectively.

Figure 2:
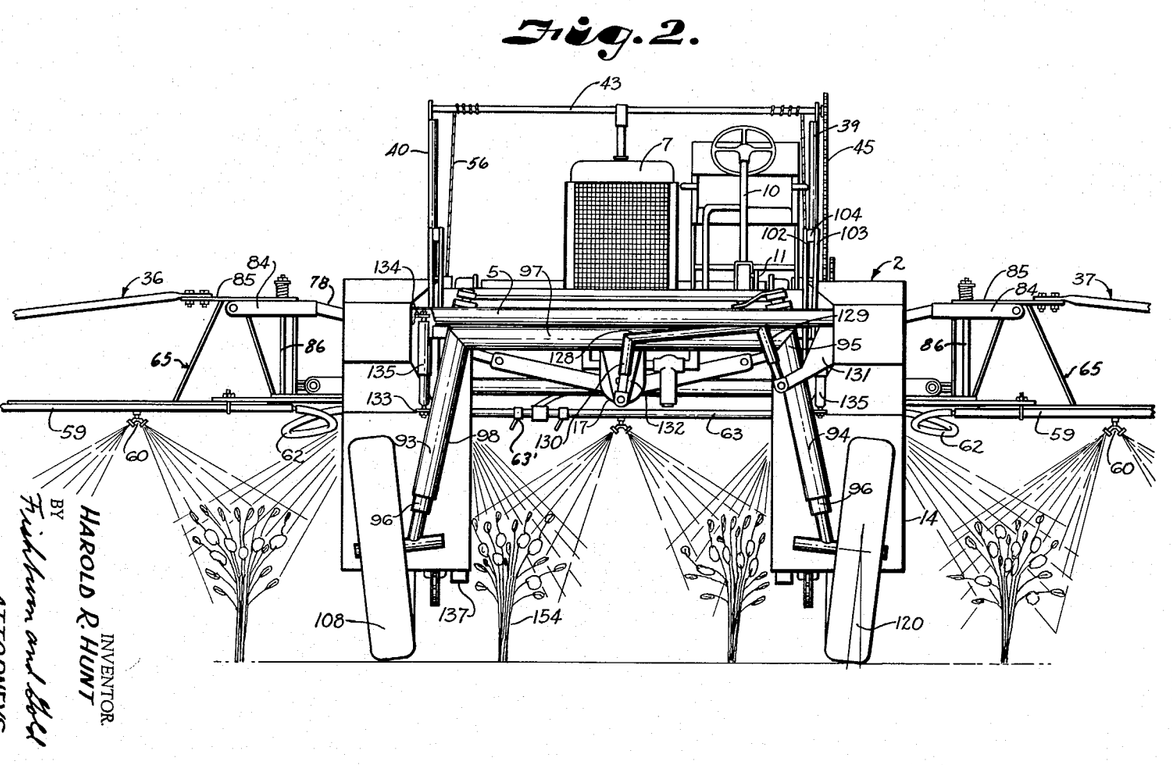
FIG. 2 is a fragmentary front elevational view of the crop spraying machine with portions of spray booms shown in spraying position.
Figure 5:
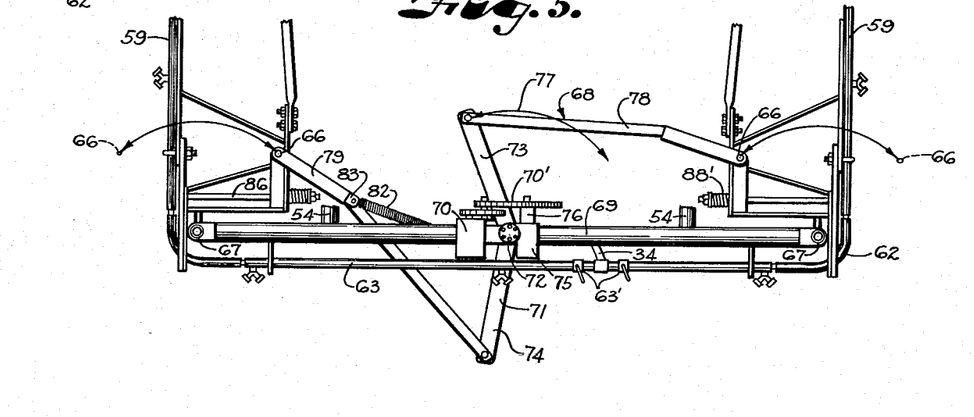
FIG. 5 is a fragmentary elevational rear view showing the spray boom pivoting members in a position whereby the booms are pivoted vertically.
Figure 6:
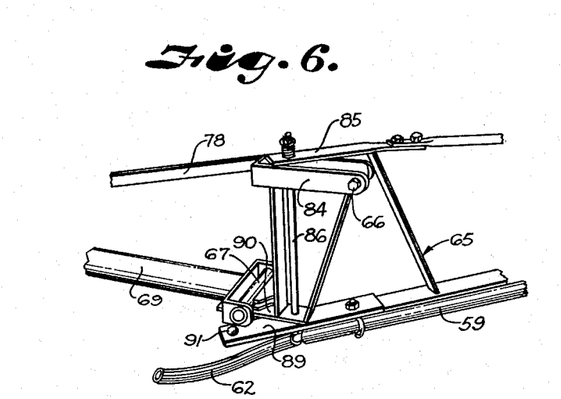
FIG. 6 is a fragmentary perspective detail view of a spray boom connection showing the boom partially pivoted horizontally.
Figure 7:
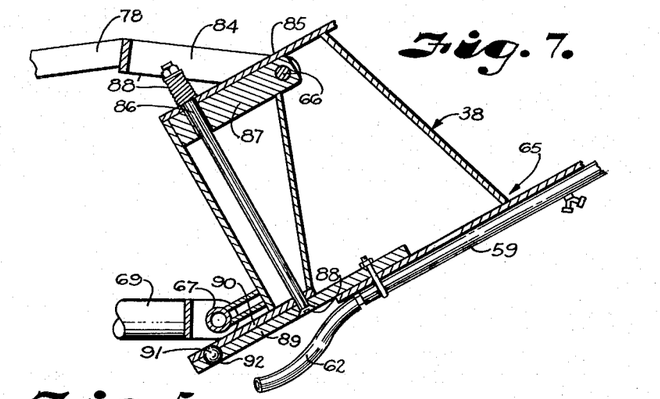
FIG. 7 is a fragmentary cross-sectional view on an enlarged scale showing a spray boom connection with the boom partially pivoted vertically.

The boom mounting structure 38 includes mechanism broadly designated 68 for vertically pivoting the spray booms 36 and 37 from a normal horizontal extending position as illustrated in FIG. 2 to a vertically extending position as illustrated in FIG. 5. The mechanism 68 has a horizontal support bar 69 fixed to and supported by the sleeves 54. A motor 70 is secured to the support bar 69 and is operably connected to a pulley speed reducer 70'. A lift member 71 has a central point 72 and rigid arms 73 and 74 radially extending in an obtuse angle from the central point 72. The lift member 71 is pivotally mounted at the central point 72 to the support bar 69 at a position transversely centrally of the frame bed 2. A gear box 75 is operably connected to the lift member 71 at the central point 72 and by a shaft 76 to the speed reducer 70' for rotating the lift member in opposite directions through an arc indicated at 77.

Figure 3:
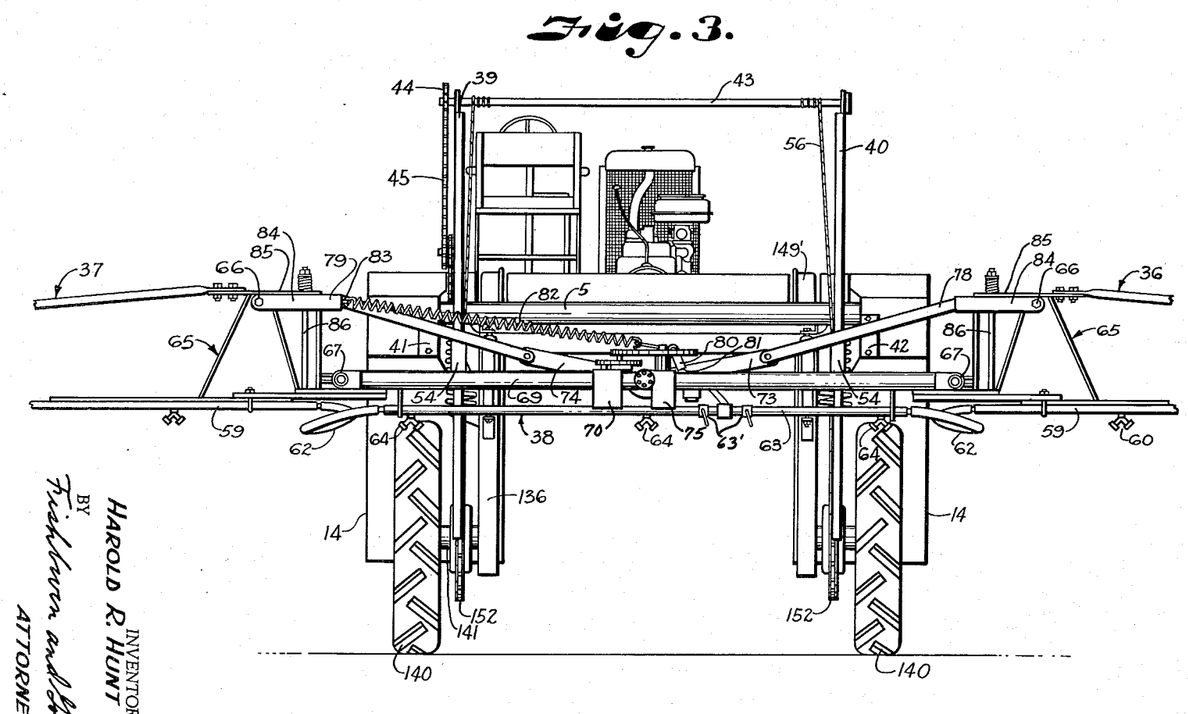
FIG. 3 is a fragmentary rear elevational view of the machine particularly showing spray boom positioning members.

Connecting links 78 and 79 are pivotally connected between the ends of the rigid arms 73 and 74 and the boom upper mounting ends 66. The boom lower mounting ends 67 are vertically pivotally connected to opposite ends of the support bar 69. The actuation of the motor 70 produces a pivoting of the lift member 71 about the central point 72 which through the connecting links 78 and 79 produces vertical pivoting of the spray booms 36 and 37 about the boom lower mounting ends 67. A lug 80 is fixed at 81 to and extends laterally from the arm 73 and has a helical tension spring 82 anchored thereto and also anchored to an intermediate portion 83 of the connecting link 79. As the spray booms pivot downwardly to a horizontal position, the tension spring 82 becomes stretched, as illustrated in FIG. 3, the tension produced by the spring reducing the torque necessary for the motor 70 to initiate the reverse pivoting of the spray booms to a vertical position.

The connecting links 78 and 79 each have a yoke portion 84 adjacent the boom upper mounting ends 66. An upper mounting ear 85 forms a part of each of the spray boom bracing structures 65 and is pivotally connected by an elongated bolt 86 to a lug portion 87. The bolt 86 is inwardly spaced toward the longitudinal center of the frame bed 2 from the upper mounting ends 66. The lug portions 87 extend snugly but slidably into the yoke portions 84; however, the upper mounting ears 85 extend out of engagement with the yokes 84 when the spray booms are in a horizontal position, FIG. 3. The lower surfaces of the ears 85 are maintained in longitudinal sliding contact with the lugs 87. When the booms are pivoted upwardly, a relative rotation is produced between the connecting links 78 and 79 and the bracing structures 65, whereby the ears 85 become trapped in the yokes 84, thus preventing any relative pivoting motion about the pivotal connections at the bolts 86.

The bolts 86 extend to form a pivotal connection at 88 normally directly below the connection with the ears 85 to permit horizontal pivoting between the spray booms and the support bar 69 adjacent the lower mounting ends 67. The pivotal connections formed by the bolts 86 at 88 are spring loaded at 88' to permit a slight separation between slidably contacting members 89 and 90 forming portions of the bracing structure 65. A ball 91 is welded or otherwise suitably secured in the member 89 with a portion thereof extending outwardly toward the member 90. The member 90 contains a suitable depression 92 adapted to receive the extending portion of the ball 91 and cooperate with the resilient pivotal connection at 88 for acting as an overload detent whereby the spray booms, when in horizontal position, may pivot horizontally either forwardly or rearwardly of the frame bed 2 in case of accidental or intentional overload forces applied thereon. Such forces may result from a boom striking an object on the ground which extends higher than the spraying level or, if desired, horizontally directed pressure on the booms may be used to release the detent mechanism to fold the spray booms against the sides of the bed for storage.

During use of the crop spraying machine, the vertical pivoting of the spray booms for clearance by actuation of the motor 70 may be accomplished without danger of the spray booms pivoting about the bolts 36 to the ground due to the engagement of the ears 85 in the respective yokes 84.

Figures 10, 11, 12:
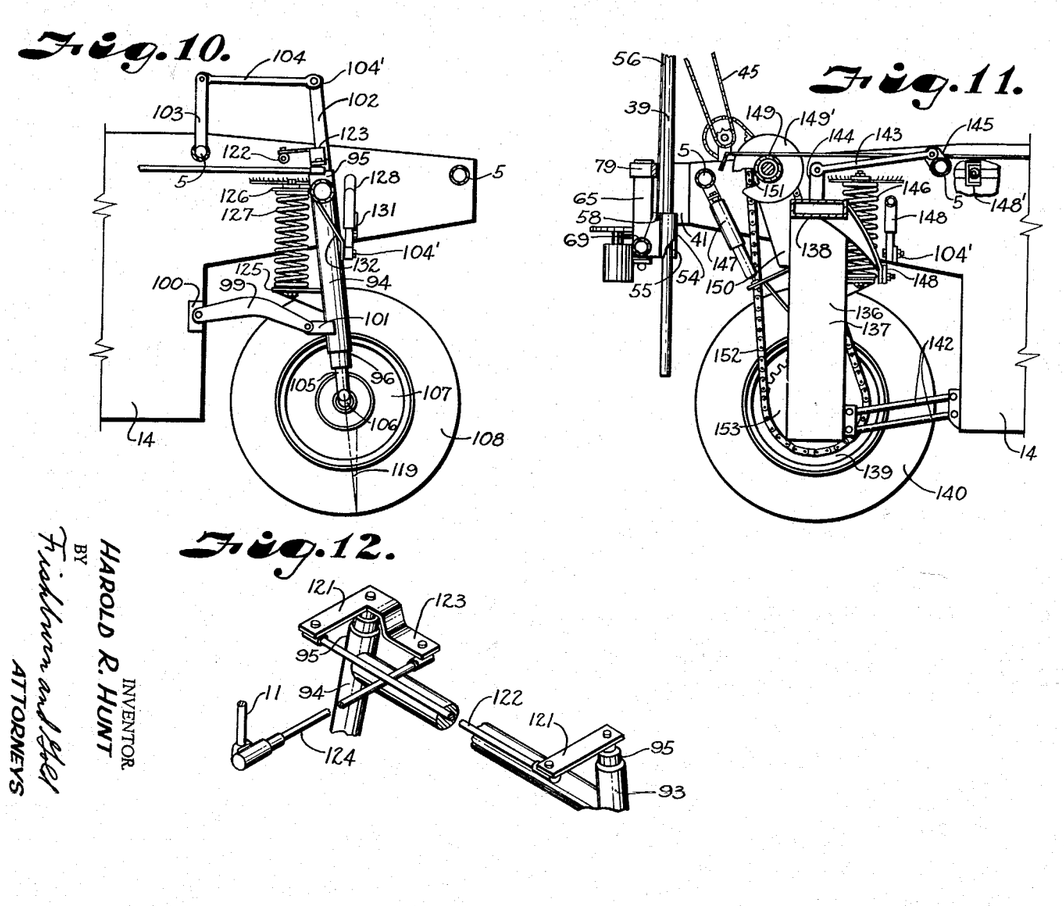
FIG. 10 is a fragmentary side elevational view through the machine showing portions of the suspension and steering mechanism for the front wheels.
FIG. 11 is a fragmentary side elevational view through the machine particularly showing portions of the rear wheel suspension and driving mechanism.
FIG. 12 is a fragmentary perspective view showing portions of the front wheel steering linkage.

A pair of spaced apart elongated front legs 93 and 94 taper outwardly as they extend downwardly from the frame bed 2. The legs 93 and 94 respectively have upper end portions 95 and lower end portions 96. A horizontally extending cross beam 97 is rigidly connected to and extends between the front leg upper end portions 95 and forms with said front legs a rigid front wheel suspension frame 98. Substantially horizontal lower suspension arms 99 are vertically pivotally connected at opposite ends thereof to the inside walls of the tanks 14 at 100 and to the front leg lower end portions 96 at 101. The arms 99 are bent upwardly intermediate the ends thereof to allow a greater wheel turning arc as noted hereafter. Rigid struts 102 are secured to the front leg upper end portions 95 and extend upwardly therefrom past the level of the frame bed 2. Brackets 103 are rigidly secured to the frame bed and extend upwardly to the elevation of the front leg struts 102. Substantially horizontal upper suspension arms 104 are vertically pivotally connected at opposite ends thereof to the front leg struts 102 and to the frame bed brackets 103 at a position spaced well above the frame bed, FIG. 1. The upper and lower suspension arms 104 and 99 pivotally support the front wheel suspension frame 98 for vertical reciprocal motion with respect to the frame bed 2 and, with the front legs 93 and 94 slanting forwardly of the frame bed 2 as they extend downwardly, FIG. 10. The pivotal connections of the front suspension arms and other suspension arm and sway bar connections described hereinafter are through rubber bushings 104' to permit a degree of lateral yielding as well as pivoting.

A kingpin shaft 105 extends coaxially through each of the front legs 93 and 94 and past the respective upper and lower end portions 95 and 96. Spindles 106 are fixed to and extend respectively outwardly and downwardly from the kingpin shaft 105 at the leg lower end portions 96. Front wheels 107, mounting suitable tires 108, are rotatably supported on the spindles 106 and, due to the sloping configuration of the kingpin shaft and spindles, have positive caster and positive camber as illustrated at 119 and 120 respectively.

Parallel steering arms 121 are fixed to the kingpin shafts 105 at the leg upper end portions 95 and an elongated rigid tie rod 122 is pivotally connected at opposite ends thereof to the steering arms 121 for maintaining synchronized turning of the kingpin shafts. A pitman arm 123 is fixed to the kingpin shaft which extends through the front leg 94 and a steering drive rod 124 is pivotally connected at opposite ends thereof to the pitman arm 123 and to the steering mechanism sector drive link 11, FIG. 12.

Vertically spaced apart spring support plates 125 and 126 are fixed respectively to the front legs 93 and 94 and the frame bed 2. Helical compression springs 127 are mounted between the spring support plates 125 and 126 for longitudinal resilient compression as the front wheel suspension frame 98 pivots vertically on the suspension arms 99 and 104.

A sway bar 128 extends substantially parallel to the cross beam 97 and has depending rigid arms 129 and 130 respectively pivotally connected to the frame bed by means of a bracket 131 and to the cross beam 97 near the center thereof by means of a rigid depending bracket or lug 132. The sway bar 128 permits pivoting of the frame bed 2 about a longitudinal axis thereof with respect to the front wheel suspension frame 98 but prevents substantial sway, and this is accomplished without interfering with relative vertical motion between the front wheel suspension frame and the frame bed.

Vertically spaced apart shock absorber mounting plates 133 and 134 are fixed respectively to the front legs 93 and 94 and the frame bed 2 and suitable shock absorbers 135 are mounted between the plates 133 and 134.

A rear wheel suspension frame 136 has vertically depending elongated rigid legs 137 connected by a rigid cross member 138. Rear wheels 139 preferably supporting deep tread tractor-like tires 140 are rotatably mounted at lower ends of the legs 137 by means of suitable outwardly directed spindles 141 fixed thereto. Parallel lower suspension arms 142 are pivotally connected between the lower ends of the legs 137 and the walls of the tanks 14. Upper suspension arms 143 are pivotally connected between upper brace members 144 fixed to and extending upwardly from the suspension frame 136 and lugs 145 fixed to one of the braces 5. The upper and lower suspension arms 143 and 142 permit the vertical displacement of the suspension frame 136 with respect to the frame bed 2 in the same manner as the front wheel suspension frame 98 described above. Also, in like manner and for the same purpose, helical compression springs 146, shock absorbers 147 and a sway bar 148 are operably connected between the frame bed 2 and the rear wheel suspension frame 136.

A prime mover drive shaft with universal joints indicated at 148' (FIGS. 1 and 11) extends rearwardly from the prime mover 6 and terminates in a differential assembly 149 which is rigidly mounted on the suspension frame 136 by means of brackets 150. The differential assembly 149 extends laterally of the frame bed 2 and terminates at opposite ends thereof in sprockets 151 engaged with drive chains 152. The drive chains 152 also engage sprockets 153 fixed to the rear wheels 139 whereby motive power is transmitted from the prime mover to the rear wheels, and yet great deflection is permitted between the rear suspension frame 136 and the frame bed 2 coupled with extensive vertical clearance between the rear wheels. Suitable hydraulic brakes 149' are mounted on the differential assembly 149 adjacent the sprockets 151 and are controlled by a suitable foot pedal (not shown) conveniently located near the operator's seat 12.

In operation, the spraying machine may be driven at high speed over very rough ground due to the unique suspension system. The steering mechanism configuration permits ease of steering and high maneuverability with either large or small quantities of spray chemicals in the tanks. As noted above, the spraying machine retains proper balance due to identical levels of chemicals in both tanks and the center of gravity is not shifted due to variations in tank contents. The chemicals are constantly maintained under high agitation for proper mixing even when no spraying is being done. The booms are not damaged by accidental contact with a stump or the like during spraying but merely pivot rearwardly to avoid the obstruction and then may be easily moved back to spraying position. The spray booms may be remotely pivoted vertically upwardly to avoid obstructions without stopping the machine and cannot fall to the ground by pivoting about horizontal pivots when the booms are even slightly pivoted upwardly. The spray booms may be remotely adjusted and maintained horizontally at the exact optimum height desired for spraying the particular crop so as to avoid undue spray chemical waste. A typical machine embodying this invention contains approximately 200 gallons in each of the tanks and has wheel centers approximately 80 inches apart so as to straddle two rows of crops such as cotton, indicated at 154.

It is to be understood that while one form of this invention has been illustrated and described, it is not to be limited to the specific form or arrangement of parts herein described and shown except insofar as such limitations are included in the claims.

What I claim and desire to secure by Letters Patent is:

1. A high speed high rise crop spraying machine comprising:
   (a) a rigid highly elevated frame bed having a front and rear portion and depending side portions between said front and rear portions, a prime mover supported on said bed, a steering mechanism fixed to said frame bed,
   (b) front and rear suspension frames respectively located at said front and rear bed portions, said suspension frames having elongated laterally spaced rigid legs extending downwardly from said frame bed at opposite sides of said frame bed, said suspension frames each having a rigid cross beam extending transversely of said bed and rigidly connecting said legs at the upper ends thereof, wheels rotatably mounted at the lower ends of said legs,
   (c) upper and lower spaced apart generally parallel suspension arms extending longitudinally of said bed and being pivotally connected to each of said legs for vertical movement, the upper suspension arms being pivotally connected with respect to said bed for vertical movement, the lower suspension arms being pivotally connected to said depending side portions for vertical movement, said suspension arms permitting vertical reciprocal motion of said suspension frames with respect to said bed for high speed travel over rough terrain, elongated helical compression springs connected between said frames and said bed,
   (d) drive means connecting said prime mover to the wheels on said rear frame for driving said machine, means connecting the wheels on said front frame to said steering mechanism for steering said machine,
   (e) said wheels, legs, bed and depending side portions defining high vertical and lateral clearance beneath said bed permitting said machine to be driven over and along high crop rows,
   (f) said front suspension frame legs slanting forwardly as they extend downwardly, a kingpin shaft extending coaxially through each of said front suspension frame legs past the lower ends thereof, and spindles fixed to and extending respectively outwardly and downwardly from said kingpin shaft at said lower ends, the wheels on said front suspension frame being rotatably supported on said spindles with positive caster and camber due to the slant of said kingpin shafts and spindles.

2. A high speed high rise crop spraying machine comprising:
   (a) a rigid highly elevated frame bed having a front and rear portion and depending side portions between said front and rear portions, a prime mover supported on said bed, a steering mechanism fixed to said frame bed,
   (b) front and rear suspension frames respectively located at said front and rear bed portions, said suspension frames having elongated laterally spaced rigid legs extending downwardly from said frame bed at opposite sides of said frame bed, said suspension frames each having a rigid cross beam extending transversely of said bed and rigidly connecting said legs at the upper ends thereof, wheels rotatably mounted at the lower ends of said legs,
   (c) upper and lower spaced apart generally parallel suspension arms extending longitudinally of said bed and being pivotally connected to each of said legs for vertical movement, the upper suspension arms being pivotally connected with respect to said bed for vertical movement, the lower suspension arms being pivotally connected to said depending side portions for vertical movement, said suspension arms permitting vertical reciprocal motion of said suspension frames with respect to said bed for high speed travel over rough terrain, elongated helical compression springs connected between said frames and said bed,
   (d) drive means connecting said prime mover to the wheels on said rear frame for driving said machine, means connecting the wheels on said front frame to said steering mechanism for steering said machine,
   (e) said wheels, legs, bed and depending side portions defining high vertical and lateral clearance beneath said bed permitting said machine to be driven over and along high crop rows, and
   (f) a sway bar pivotally connected at opposite ends respectively thereof to said front suspension frame cross beam at the center thereof and to said frame bed near one side thereof, said sway bar permitting pivoting of said frame bed about a longitudinal axis thereof with respect to said front wheel suspension frame but preventing substantial sway thereof without interfering with relative vertical motion between said front wheel suspension frame and said frame bed.

3. A high speed high rise crop spraying machine comprising:
   (a) a rigid highly elevated frame bed having a front and rear portion and depending side portions between said front and rear portions, a prime mover supported on said bed, a steering mechanism fixed to said frame bed,
   (b) front and rear suspension frames respectively located at said front and rear bed portions, said suspension frames having elongated laterally spaced rigid legs extending downwardly from said frame bed at opposite sides of said frame bed, said suspension frames each having a rigid cross beam extending transversely of said bed and rigidly connecting said legs at the upper ends thereof, wheels rotatably mounted at the lower ends of said legs,
   (c) upper and lower spaced apart generally parallel suspension arms extending longitudinally of said bed and being pivotally connected to each of said legs for vertical movement, the upper suspension arms being pivotally connected with respect to said bed for vertical movement, the lower suspension arms being pivotally connected to said depending side portions for vertical movement, said suspension arms permitting vertical reciprocal motion of said suspension frames with respect to said bed for high speed travel over rough terrain, elongated helical compression springs connected between said frames and said bed,
   (d) drive means connecting said prime mover to the wheels on said rear frame for driving said machine, means connecting the wheels on said front frame to said steering mechanism for steering said machine,
   (e) said wheels, legs, bed and depending side portions defining high vertical and lateral clearance beneath said bed permitting said machine to be driven over and along high crop rows, and
   (f) spaced apart shock absorber mounting plates fixed respectively to said front and rear suspension frames and said frame bed, and shock absorbers mounted between said respective mounting plates.

References Cited by the Examiner

UNITED STATES PATENTS

| 596,669 | 1/98 | Twining | 239—168 |
| 2,094,871 | 10/37 | Brown | 180—41 X |
| 2,221,433 | 11/40 | Pitner | 239—168 |
| 2,266,280 | 12/41 | Sherman | 267—20 |
| 2,273,344 | 2/42 | Black et al. | 239—166 X |
| 2,305,913 | 12/42 | Troyer | 239—168 |

(Other references on following page)

UNITED STATES PATENTS

| | | | |
|---|---|---|---|
| 2,447,679 | 8/48 | Baghuis | 280—124 |
| 2,548,482 | 4/51 | Kouril | 239—164 |
| 2,628,128 | 2/53 | Rhodeen | 239—162 |
| 2,647,794 | 8/53 | Mueller et al. | 239—159 |
| 2,647,795 | 8/53 | Kucera | 239—167 |
| 2,657,093 | 10/53 | Kucera | 239—168 |
| 2,725,256 | 11/55 | Devost et al. | 239—167 |
| 2,743,133 | 4/56 | Badders | 239—168 |
| 2,755,128 | 7/56 | Baish | 239—168 |
| 2,941,817 | 6/60 | Benson | 267—66 |
| 2,963,226 | 12/60 | La Roque | 239—157 |
| 2,985,379 | 5/61 | Strickland | 239—142 X |
| 3,111,335 | 11/63 | Hickman | 267—20 X |

FOREIGN PATENTS 717,249  10/54  Great Britain.

MILTON BUCHLER, *Primary Examiner.*
ROBERT A. O'LEARY, EVERETT W. KIRBY, A. HARRY LEVY, *Examiners.*